United States Patent
Oh et al.

(10) Patent No.: US 11,683,195 B2
(45) Date of Patent: Jun. 20, 2023

(54) COOKING MENU COMMUNICATION AND METHODS OF OPERATING A COOKING APPLIANCE

(71) Applicant: Haier US Appliance Solutions, Inc., Wilmington, DE (US)

(72) Inventors: Youngjin Oh, Seoul (KR); Hyuk-chul Kwon, Seongnam (KR); Byung Cheon Lee, Seongnam-Si (KR); JuChan Park, Gyeonggi-do (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/494,920

(22) Filed: Oct. 6, 2021

(65) Prior Publication Data

US 2023/0109071 A1 Apr. 6, 2023

(51) Int. Cl.
*H04L 12/28* (2006.01)
*A47J 27/00* (2006.01)
*A47J 36/32* (2006.01)

(52) U.S. Cl.
CPC ........ *H04L 12/2827* (2013.01); *A47J 27/004* (2013.01); *A47J 36/321* (2018.08); *H04L 12/282* (2013.01); *H04L 2012/285* (2013.01); *H04L 2012/2841* (2013.01)

(58) Field of Classification Search
CPC .............. H04L 12/2827; H04L 12/282; H04L 2012/2841; H04L 2012/285; A47J 27/004; A47J 36/321
See application file for complete search history.

(56) References Cited

U.S. PATENT DOCUMENTS

| | | | |
|---|---|---|---|
| 9,385,784 B2 | 7/2016 | Kim | |
| 2013/0264383 A1* | 10/2013 | Ko | G06K 7/10415 235/375 |
| 2015/0002291 A1* | 1/2015 | Kizuki | G08B 1/08 340/539.11 |
| 2015/0061997 A1* | 3/2015 | Chi | G06F 1/163 345/156 |
| 2016/0338531 A1* | 11/2016 | McIntyre | A47J 36/321 |
| 2016/0381742 A1 | 12/2016 | Banavara | |
| 2017/0139385 A1* | 5/2017 | Young | G09B 19/0092 |
| 2017/0224149 A1* | 8/2017 | Koennings | G05B 19/41815 |
| 2017/0353998 A1* | 12/2017 | Cha | H05B 6/6435 |
| 2018/0007949 A1* | 1/2018 | Sung | B33Y 30/00 |
| 2021/0186260 A1* | 6/2021 | Bhogal | H04L 67/125 |

FOREIGN PATENT DOCUMENTS

EP  2647916 A1  10/2013

\* cited by examiner

*Primary Examiner* — Charles R Kasenge
(74) *Attorney, Agent, or Firm* — Dority & Manning, P.A.

(57) ABSTRACT

A method may include receiving a menu set selection including a plurality of predetermined dish options at a registered user device and transmitting the menu set selection to an unregistered user device. The method may further include receiving a recipe selection of one or more of the plurality of predetermined dish options from the unregistered user device and directing a cooking operation at the cooking appliance based on the received recipe selection.

20 Claims, 5 Drawing Sheets

COOKING MENU COMMUNICATION AND METHODS OF OPERATING A COOKING APPLIANCE

FIELD OF THE INVENTION

The present subject matter relates generally to cooking appliances, and more particularly to methods of operating a cooking appliance with communication of a user-selected menu.

BACKGROUND OF THE INVENTION

Users can operate an cooking appliance to cook food items as desired by selecting or manipulating various operational features of the oven appliance, such as, for example, the temperature setting or mode of operation (i.e., bake, broil, etc.). In some instances, users may desire to select, program, or manipulate certain operational features remotely or "hands free." Some cooking appliances and even been configured so that they may be controlled remotely on a user's smartphone or computer. Even if features are not directly controlled remotely, it may be useful to permit communication of certain information or options to a remote device. In order to facilitate this control or communication, some appliances can include features for connecting to and communicating with a remote device (e.g., a commissioned or registered device) over a secure wireless network. Such communication may provide connected features on the domestic appliances to permit the domestic appliance to communicate with a personal device, smart home systems, or a remote database such as a cloud server.

Although some appliance or systems include features for permitting communication/control with a remote device that has been previous commissioned or registered with a particular appliance, difficulties can arise with the use of additional remote devices. In particular, it may be difficult to share information between two or more discrete remote devices. This may be especially true if one or more remote devices has not been previously commissioned, registered, or associated with the appliance. Moreover, some people may have difficulties (e.g., due to distance from the appliance or lack of comfort with technology).

Accordingly, a cooking appliance and method for operating the same that addresses one or more of the challenges noted above would be desirable. In particular, it may be advantageous to provide an appliance or system with features for communicating with an unregistered remote device.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a cooking appliance is provided. The method may include receiving a menu set selection including a plurality of predetermined dish options at a registered user device and transmitting the menu set selection to an unregistered user device. The method may further include receiving a recipe selection of one or more of the plurality of predetermined dish options from the unregistered user device and directing a cooking operation at the cooking appliance based on the received recipe selection.

In another exemplary aspect of the present disclosure, a method of operating a cooking appliance is provided. The method may include receiving a menu set selection including a plurality of predetermined dish options at a registered user device and transmitting the menu set selection to an unregistered user device corresponding to a device address selected at the registered user device. The method may further include transmitting the menu set selection to the cooking appliance. Transmitting the menu set selection to the cooking appliance may include transmitting appliance instructions corresponding to each predetermined dish option of the plurality of predetermined dish options. The method may still further include receiving a recipe selection of one or more of the plurality of predetermined dish options from the unregistered user device and directing a cooking operation at the cooking appliance based on the received recipe selection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
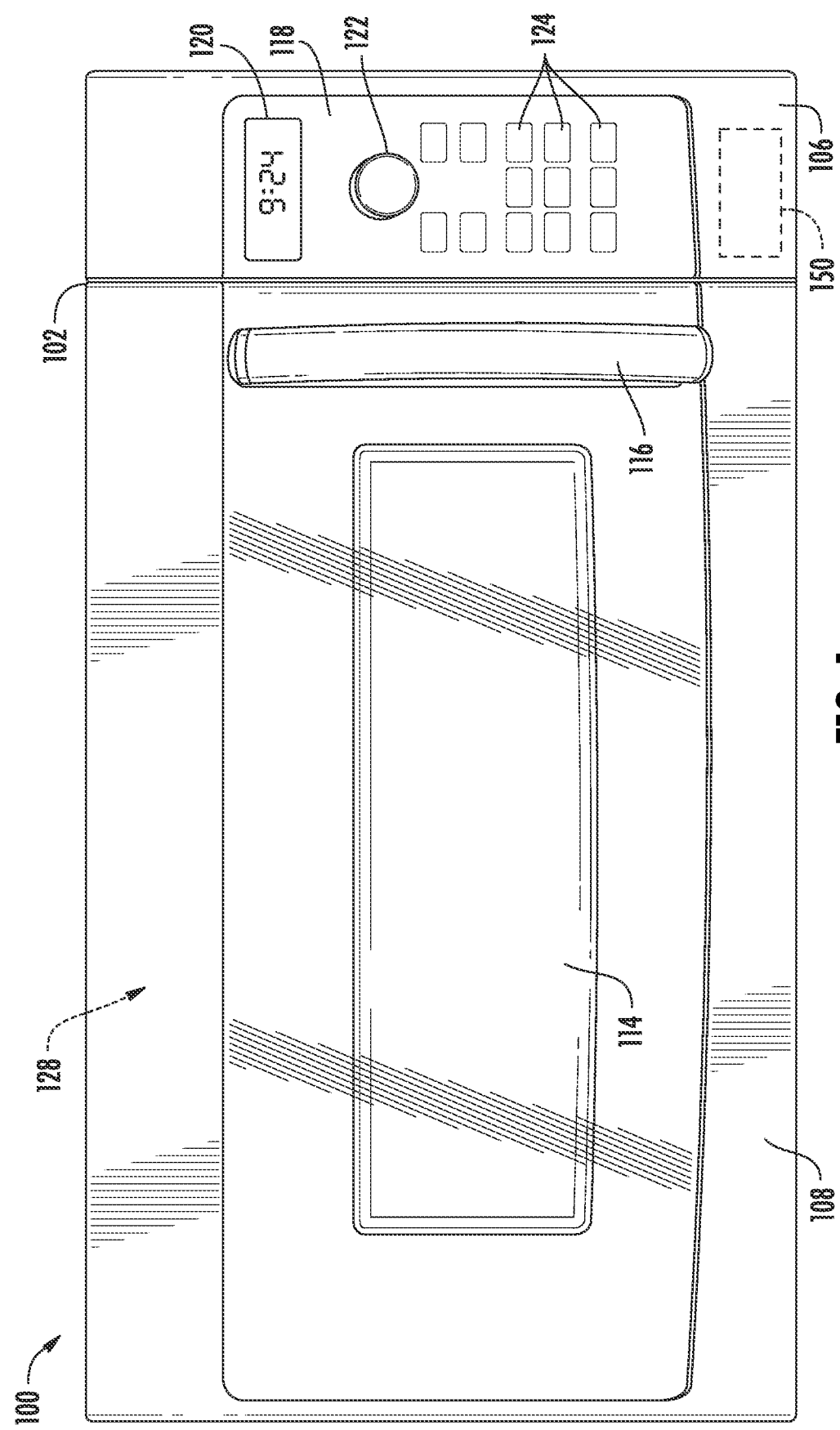
FIG. 1 provides a front elevation view of a cooking appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Turning now to the figures, FIG. 1 provides a front view of a cooking appliance 100 according to an example embodiment of the present subject matter. In some embodiments, cooking appliance 100 includes or is provided as an "over-the-range" oven, such as shown. Nonetheless, it is understood that the present disclosure generally applies to any suitable cooking appliance. For instance, the cooking appliance 100 according to other exemplary embodiments may include or be provided as a countertop oven, a wall oven, or other oven configurations as will be recognized by those of skill in the art.

Cooking appliance 100 includes a housing or casing 102 that defines a cooking cavity 128. Food items can be received within cooking cavity 128. A door 108 is rotatably mounted to casing 102 and is movable between an open position and a closed position (shown in FIG. 1) to provide selective access to cooking cavity 128. In some embodiments, a window 114 in door 108 is provided for viewing food items in the cooking cavity 128. Additionally or alternatively, a handle 116 may be secured to door 108 (e.g., to open or close door 108). Cooking appliance 100 may also include a control panel frame 106. In some such embodiments, a control panel 118 is mounted within control panel frame 106.

As shown, control panel 118 may include a display device 120 for presenting various information to a user. Additionally or alternatively, control panel 118 may include one or more input devices. For instance, the input devices of control panel 118 may include a knob or dial 122 and tactile control buttons 124. In some such embodiments, selections may be made by rotating dial 122 clockwise or counterclockwise, and when the desired selection is displayed, pressing dial 122. Further additionally or alternatively, display device 120 can also be used as an input device. For instance, in such embodiments, display device 120 can be a touchscreen device, as would be understood. Moreover, as will be described in detail below, one or more user devices 310 or 410 (e.g., discrete general-purpose computer, special purpose computer, laptop, desktop, integrated circuit, mobile device, smartphone, tablet, etc.) may be in operable (e.g., wireless) communication with cooking appliance 100 to act as an input device to transmit input signals to cooking appliance 100.

Figure 2:
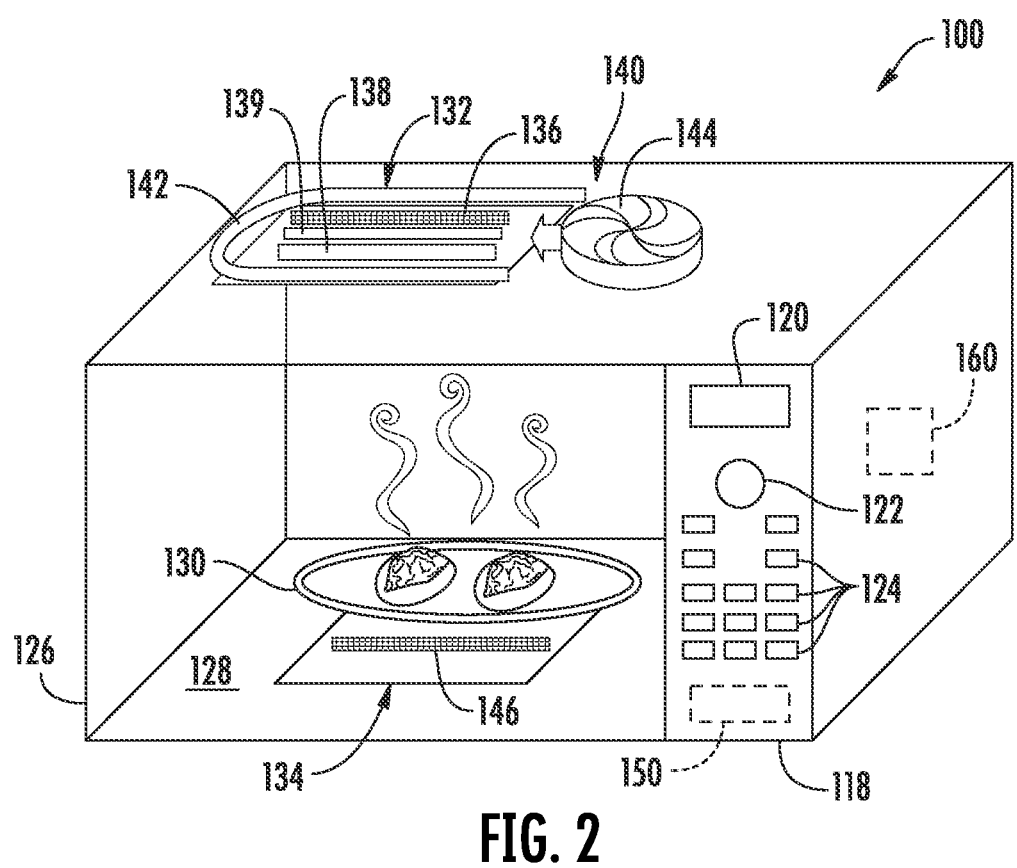
FIG. 2 provides a schematic view of a cooking appliance according to exemplary embodiments of the present disclosure.
Figure 3:
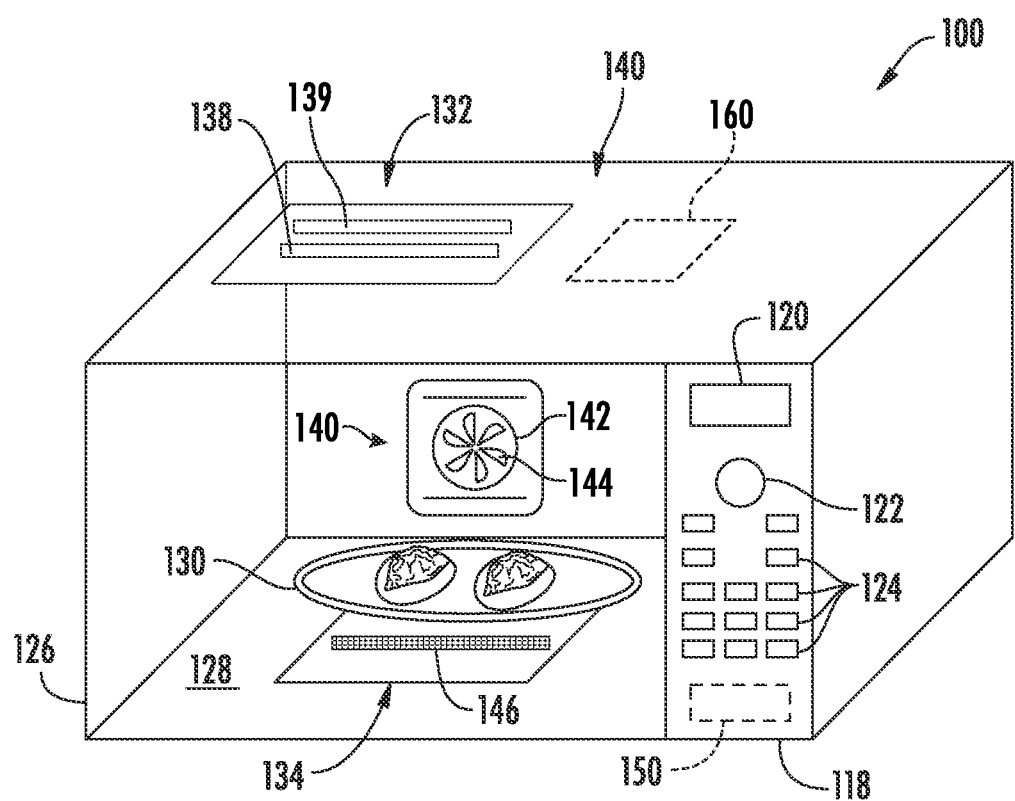
FIG. 3 provides a schematic view of a cooking appliance according to other exemplary embodiments of the present disclosure.

FIG. 2 provides a schematic view of cooking appliance 100 in one or more example embodiments and FIG. 3 provides a schematic view of cooking appliance 100 in one or more additional example embodiments. As shown in FIGS. 2 and 3, in some example embodiments, casing 102 (FIG. 1) of cooking appliance 100 includes a shell 126. Shell 126 of casing 102 may delineate the interior volume of cooking cavity 128. The walls of shell 126 may be constructed using high reflectivity (e.g., 72% reflectivity) stainless steel, or any other suitable material. In optional embodiments, a turntable 130 is located in cooking cavity 128 and is rotatable about an axis of rotation (e.g., for rotating food items during a cooking operation).

Generally, cooking appliance 100 includes one or more heater assemblies (e.g., resistive heating element, radiant heating element, gas burner, microwave module, inductive heating element, etc.) for heating food items within the interior volume of cooking cavity 128. Optionally, multiple discrete heating assemblies are included. Two or more such heating assemblies may be of the same type (e.g., operate according to the same cooking/heating principles, such as would be the case with two discrete resistive heating elements) or of differing types (e.g., operate according to different cooking/heating principles, such as would be the case with one resistive heating and a microwave module).

In the illustrated embodiments, cooking appliance 100 includes a microwave module 160, an upper heater module 132, a lower heater module 134, and a convection module 140. In the example embodiment of FIG. 2, the convection module 140 is positioned above the cooking cavity 128. FIG. 3 schematically illustrates an additional example embodiment of the cooking appliance 100, where the convection module 140 (including sheath 142 and convection fan 144) is provided at a back of the cooking chamber 128. In some embodiments, microwave module 160 is located on a side of cooking cavity 128 (e.g., as illustrated in FIG. 2), while in other example embodiments, the microwave module 160 may be located above the cooking cavity 128 (e.g., as illustrated in FIG. 3). As would be understood, the microwave module 160 delivers microwave energy into cooking cavity 128. In some embodiments, the microwave module 160 includes a magnetron to provide the microwave energy. In other embodiments, the microwave module 160 may also or instead include a solid-state radio frequency device (e.g., a low-voltage printed circuit board with semiconductors embedded therein which output microwave energy at various frequencies and power output levels).

Upper heater module 132 can include one or more heating elements. For instance, upper heating module 132 can include one or more halogen cooking lamps or one or more ceramic heaters. For the depicted embodiment of FIG. 2, upper heating module 132 includes a ceramic heater 136 and a halogen cooking lamp 138. In some example embodiments, upper heater module 132 has at least two halogen lamps 138, 139 configured to deliver radiant and thermal energy into the cooking cavity 128, such as in the example embodiment depicted in FIG. 3.

Convection module 140 may include a resistive heater, such as sheath heater 142, as well as a convection fan 144. In particular, convection fan 144 may be provided for blowing or otherwise moving air over sheath heater 142 of convection module 140 and into cooking cavity 128 (e.g., for convection cooking). Lower heater module 134 may include at least one heating element. The heating element of lower heater module 134 can be a ceramic heater or a halogen lamp, for example. For the example embodiments illustrated in FIGS. 2 and 3, the heating element of lower heater module 134 is illustrated as a ceramic heater 146. In various embodiments, cooking appliance 100 may be a 240V cooking appliance 100 or a 120V cooking appliance 100, for example.

The specific heating elements of upper and lower heater modules 132, 134, convection module 140, and radio frequency (RF) generation system of microwave module 160 (e.g., a magnetron or solid state RF generation system) can vary from embodiment to embodiment, and the elements and system described above are exemplary only. For example, the upper heater module 132 can include any combination of heaters including combinations of halogen lamps, ceramic lamps, or sheath heaters. Similarly, lower heater module 134 can include any combination of heaters including combinations of halogen lamps, ceramic lamps, or sheath heaters. In addition, the heaters can all be one type of heater. The specific ratings and number of lamps or heaters utilized in the upper and lower modules 132, 134 and convection module 140 can vary from embodiment to embodiment. In some embodiments, the combinations of lamps, heaters, and RF generation system may be selected to provide the desired cooking characteristics for precision cooking in various modes or operations.

Turning now to FIGS. 1 through 4, FIG. 4 provides an exemplary system 1000 for controlling cooking appliance 100. As shown, cooking appliance 100 includes controller 150. Generally, controller 150 can be positioned in any suitable location throughout cooking appliance 100. For example, controller 150 may be located proximate control panel 118 toward the front portion of cooking appliance 100.

Controller 150 of cooking appliance 100 can include one or more processor(s) and one or more memory device(s). The processor of controller 150 can be any suitable processing device (e.g., a processor core, a microprocessor, an ASIC, a FPGA, a microcontroller, etc.) and can be one processor or a plurality of processors that are operatively connected. The memory device of controller 150 can include one or more non-transitory computer-readable storage mediums, such as RAM, ROM, EEPROM, EPROM, flash memory devices, magnetic disks, etc., and combinations thereof. The memory device of controller 150 can store information accessible by the processor(s) of controller 150 including instructions that can be executed by the processor(s) of controller 150 in order to execute various cooking operations or cycles (e.g., a meal cook cycle). Controller 150 is communicatively coupled (i.e., in operative wired or wireless communication) with various operational components of cooking appliance 100, such as the heater assemblies 160, 132, 134, 140 (e.g., the heating elements thereof) or control panel 118.

In certain embodiments, controller 150 is communicatively coupled with components of microwave module 160, upper heater module 132, lower heater module 134, convection module 140, or control panel 118, including display device 120, dial 122, the various control buttons 124, etc.

In some embodiments, multiple predetermined dish options, such as meal cook cycles or other cooking algorithms can be preprogrammed in or loaded onto a memory device of a controller 150 of cooking appliance 100. Each of the predetermined dish options correspond to a recipe, food item, or cooking operation to be executed/performed by the cooking appliance 100 (e.g., appliance instructions). Moreover, dish options may be provided for many different food items or types of food items (e.g., pizza, fried chicken, French fries, potatoes, etc.). For instance, one of the predetermined dish options may correspond to or include appliance instructions for cooking baked chicken while another of the predetermined dish options may correspond to or include appliance instructions for cooking steak. As would be understood, different food items may require different types of cooking or heat from one or more of the heater assemblies (e.g., microwave module 160, an upper heater module 132, a lower heater module 134, and a convection module 140), such as to vary the intensity/temperature, duration, or of heat generation from the heater assemblies, or even which of the heater assemblies should be activated to generate heat within the cooking cavity 128.

Optionally, one or more of the cooking algorithms may include simultaneous preparation of a group of food items of different food types comprising an entire meal. When a user is cooking a particular food item or group of food items for which there is a preprogrammed cooking algorithm, the preprogrammed cooking algorithm can be selected (e.g., via the control panel 118 or a remote device 310, 410). Instructions and selections may be displayed on display device 120. Additionally or alternatively, the preprogrammed cooking algorithm can be selected via one or more user devices.

Figure 4:
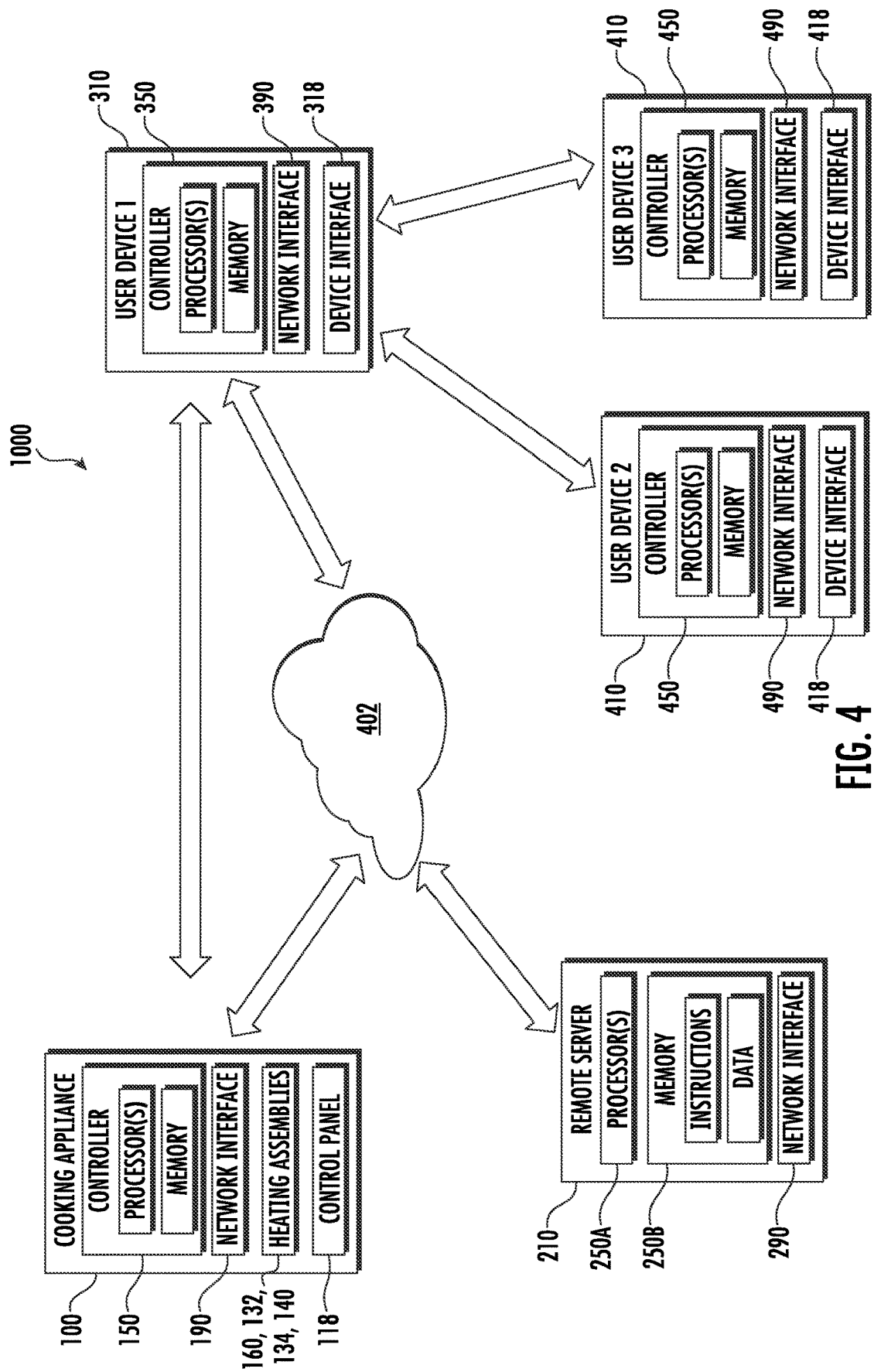
FIG. 4 provides a schematic view of a system for controlling a cooking appliance according to exemplary embodiments of the present disclosure.

Turning especially to FIG. 4, in additional or alternative embodiments, controller 150 includes a network interface 190 such that controller 150 can connect to and communicate over one or more networks (e.g., network 402) with one or more network nodes, such as a remote server 210. Controller 150 can also include one or more transmitting, receiving, or transceiving components for transmitting/receiving communications with other devices (e.g., a first or primary user device 310) registered and communicatively coupled with cooking appliance 100. Additionally or alternatively, one or more transmitting, receiving, or transceiving components can be located off board controller 150.

Input/output ("I/O") signals may be routed between controller 150 and various components of cooking appliance 100, such as control panel or heater assemblies, as well as one or more nodes (e.g., via network 402). Controller 150 can execute and control cooking appliance 100 in various cooking operations or cycles, such as precision cooking, which includes meal cook, microwave, and convection/bake modes.

Network 402 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 402 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 210, such as a web server, is in operable communication with cooking appliance 100 or one or more user devices 310 or 410. The remote server 210 can be used to host a registration platform (e.g., for user accounts and registration of particular user devices with corresponding appliances, as would be understood). Additionally or alternatively, the remote server 210 can be used to host an information database (e.g., for storing recipes; menu sets; dishes or meals; or instructions/algorithms for an appliance to cook or generate certain dish options, such as meal cook cycles). The remote server 210 can be implemented using any suitable computing device(s). The remote server 210 may include one or more processors 250A and one or more memory devices 250B (i.e., memory). The one or more processors 250A can be any suitable processing device (e.g., a processor core, a microprocessor, an ASIC, a FPGA, a microcontroller, etc.) and can be one processor or a plurality of processors that are operatively connected. The memory device 250B can include one or more non-transitory computer-readable storage mediums, such as RAM, ROM, EEPROM, EPROM, flash memory devices, magnetic disks, etc., and combinations thereof. The memory devices 250B can store data and instructions which are executed by the processor 250A to cause remote server 210 to perform operations.

The memory devices 250B may also include data, such as recipe data packets or predetermined dish options (e.g., which may be configured to initiate a cooking operation at cooking appliance 100), identifier data (e.g., corresponding to a particular user or registered user device), etc., that can be retrieved, manipulated, created, or stored by processor 250A. The data can be stored in one or more databases. The one or more databases can be connected to remote server 210 by a high bandwidth LAN or WAN, or can also be connected to remote server 210 through network 402. The one or more databases can be split up so that they are located in multiple locales.

Remote server 210 includes a network interface 290 such that interactive remote server 210 can connect to and communicate over one or more networks (e.g., network 402) with one or more network nodes. Network interface 290 can be an onboard component or it can be a separate, off board component. In turn, remote server 210 can exchange data with one or more nodes over the network 402. As an example, remote server 210 can exchange data with cooking appliance 100 and a corresponding registered user device (e.g., first or primary user device 310). In some embodiments, data, including user account tokens or menu sets (e.g., collections of multiple predetermined dish options that may be cooked on cooking appliance 100), may be exchanged through remote server 210 or provided to one or more nodes of network 402.

In certain embodiments, a registered user device (e.g., first user device 310) is communicatively coupled with cooking appliance 100 such that the registered device can communicate directly with cooking appliance 100. As would be understood, the first user device 310 may be previously commissioned with the same user account as the cooking appliance 100 to establish a secure connection and permit communication between the first user device 310 and the cooking appliance 100. During use, first user device 310 can thus communicate with cooking appliance 100 via a secure connection established through network 402 or another suitable wireless interface.

First user device 310 can be any type of suitable remote computing device, such as, for example, a personal computing device (e.g., laptop or desktop), a mobile computing device (e.g., smartphone or tablet), a gaming console or controller, a wearable computing device, an embedded computing device, or a remote. First user device 310 can include one or more user device controllers 350. Controller 350 can include one or more processors and one or more memory devices. The one or more processors can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor to cause first user device 310 to perform operations. Controller 350 may include a user device network interface 390 such that first user device 310 can connect to and communicate over one or more networks (e.g., network 402) with one or more network nodes. Network interface 390 can be an onboard component of controller 350 or it can be a separate, off board component. Controller 350 can also include one or more transmitting, receiving, or transceiving components for transmitting/receiving communications with other devices communicatively coupled with first user device 310. Additionally or alternatively, one or more transmitting, receiving, or transceiving components can be located off board controller 350.

First user device 310 generally includes a first device interface 318. As would be understood, the device interface can include one or more user inputs (e.g., buttons, knobs, one or more cameras, etc.) or a monitor configured to display graphical user interfaces or other visual representations to user. For example, the monitor can display graphical user interfaces corresponding to operational features of cooking appliance 100 (e.g., multiple meal cook cycles or dish options that can be prepared by the cooking appliance 100) such that user may manipulate or select the features to operate cooking appliance 100. The monitor can be a touch sensitive component (e.g., a touch-sensitive display screen or a touch pad) that is sensitive to the touch of a user input object (e.g., a finger or a stylus). For example, a user may touch the monitor with his or her finger and type in a series of numbers on the monitor. In addition, motion of the user input object relative to the monitor can enable a user to provide input to first user device 310. First user device 310 may provide other suitable methods for providing input to first user device 310 as well. Moreover, first user device 310 can include one or more speakers, one or more cameras, or more than one microphones such that first user device 310 is configured with voice control, motion detection, and other functionality.

Separate from the registered (e.g., first) user device 310, one or more unregistered user devices 410 (e.g., a second user device or third user device) may be provided to communicate indirectly with the cooking appliance 100 (e.g., via a remote server 210 or the first user device 310) or directly with the cooking appliance 100 (e.g., via a physically limited protocol, such as a Near-Field Communication (NFC) connection).

Generally, one or more of the unregistered user devices 410 and first user device 310 can communicate through a suitable messaging platform or service. Such messaging platforms or services (and the hardware/software necessitated by the same) are generally known and permit data to pass between two devices (e.g., wirelessly, such as through the internet or a cellular data network, using known protocols). As an example, a simple notification service (SNS) web service may facilitate message/data transmission between an unregistered user device 410 and the first user device 310. The user devices 310 and 410 may each have a discrete device address, such as an IP or MAC address, that corresponds to that particular device 310 or 410 and permits identification of the particular device 310 or 410. Thus, a user of the first user device 310 may select the device address e.g., a shortcut or phone number corresponding to the same) of an unregistered device 410 (on the first user device 310 to send a message/data to the same unregistered user device 410. Additionally or alternatively, mobile messaging applications (e.g., KakaoTalk, Wechat, etc.) installed on the user devices 310 or 410 may facilitate communication between the same.

As will be described in detail below, certain communications from the unregistered user devices 410 may be transmitted to the cooking appliance 100 through or by way of the first user device 310. Additionally or alternatively, certain communications from the unregistered user devices 410 may be transmitted to the cooking appliance 100 through or by way of a limited direct connection, such as a NFC connection directly between the unregistered user device 410 and the cooking appliance 100.

An unregistered user device 410 can be any type of suitable remote computing device, such as, for example, a personal computing device (e.g., laptop or desktop), a mobile computing device (e.g., smartphone or tablet), a gaming console or controller, a wearable computing device, an embedded computing device, or a remote. Unregistered user device 410 can include one or more user device controllers 450. Controller 450 can include one or more processors and one or more memory devices. The one or more processors can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor to cause unregistered user device 410 to perform operations. Controller 450 may include a user device network interface 490 such that unregistered user device 410 can connect to and communicate over one or more networks (e.g., network 402) with one or more network nodes. Network interface 490 can be an onboard component of controller 450 or it can be a separate, off board component. Controller 450 can also include one or more transmitting, receiving, or transceiving components for transmitting/receiving communications with other devices communicatively coupled with unregistered user device 410. Additionally or alternatively, one or more transmitting, receiving, or transceiving components can be located off board controller 450.

Unregistered user device 410 generally includes a (e.g., second or third) device interface 418. As would be understood, the device interface can include one or more user inputs (e.g., buttons, knobs, one or more cameras, etc.) or a monitor configured to display graphical user interfaces or other visual representations to user. For example, the monitor can display graphical user interfaces corresponding to operational features of cooking appliance 100 (e.g., multiple meal cook cycles or dish options that can be prepared by the cooking appliance 100) such that user may manipulate or select the features to operate cooking appliance 100. The monitor can be a touch sensitive component (e.g., a touch-sensitive display screen or a touch pad) that is sensitive to the touch of a user input object (e.g., a finger or a stylus). For example, a user may touch the monitor with his or her finger and type in a series of numbers on the monitor. In addition, motion of the user input object relative to the monitor can enable a user to provide input to unregistered user device 410. Unregistered user device 410 may provide other suitable methods for providing input to unregistered user device 410 as well. Moreover, unregistered user device 410 can include one or more speakers, one or more cameras, or more than one microphones such that unregistered user device 410 is configured with voice control, motion detection, and other functionality.

Figure 5:
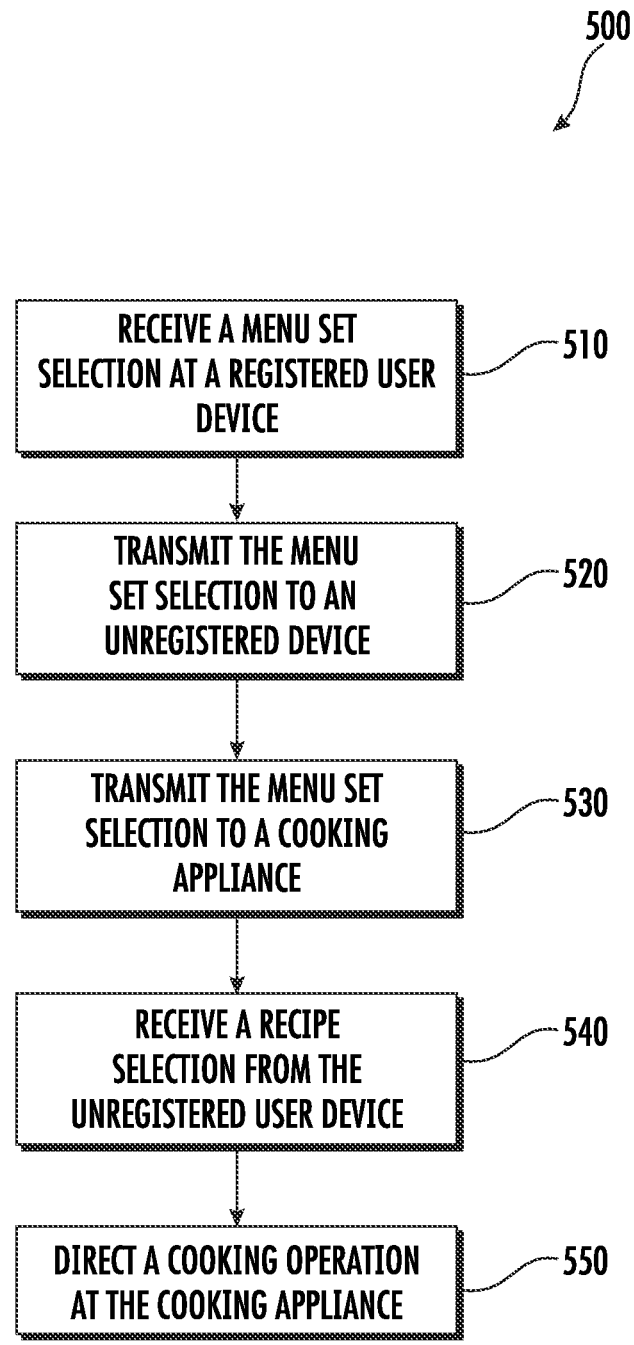
FIG. 5 provides a flow chart of a method of operating a cooking appliance according to exemplary embodiments of the present disclosure.

Referring now to FIG. 5, various methods may be provided for use with system 1000 (FIG. 4) in accordance with the present disclosure. In general, the various steps of methods as disclosed herein may, in exemplary embodiments, be performed by one or more of the controllers 150, 350, or 450 as part of a cooking operation (e.g., that the controller 150, 350, or 450 is configured to direct or initiate, at least in part) for cooking food items within the cooking appliance 100. During such methods, one or more of the controllers 150, 350, or 450 may receive inputs and transmit outputs from various other components of the system 1000. For example, controller 150 350 450 may send signals to and receive signals from cooking appliance 100, remote server 210, or one or more unregistered user devices 410. In particular, the present disclosure is further directed to methods, as indicated by 500, for operating system 1000, including cooking appliance 100. Such methods advantageously permit users of an unregistered user device 410 to influence the cooking operation (e.g., without requiring the unregistered user device 410 to be commissioned or otherwise associated with the cooking appliance 100 or without requiring the unregistered user device 410 to install a specific software program corresponding to the cooking appliance 100).

Turning especially to FIG. 5, at 510, the method 500 includes receiving a menu set selection at a registered (e.g., first or primary) user device. As would be understood, prior to 510, the registered user device commissions the cooking appliance such that the registered device and cooking appliance are associated with a common user account. To this end, a provisioning token may be exchanged or received (e.g., from a remote server). Moreover, following commissioning, the cooking appliance may be monitored or controlled by a specific software program ("Appliance App") on the registered device that corresponds to the cooking appliance. As a result, the menu set selection may be made at the Appliance App on the registered device.

Generally, the menu set selection includes a plurality of predetermined dish options. As described above, each of the predetermined dish options correspond to a recipe, food item, or cooking operation to be executed/performed by the cooking appliance (e.g., appliance instructions). Thus, a user on the registered device is able to select one or more predetermined dish options (e.g., out of a database of multiple predetermined dish options) for different dishes or food items that can be cooked within the cooking appliance. These selections can then be grouped or transmitted as the menu set selection.

In some embodiments, each of the predetermined dish options includes instructions or a cooking algorithm to be executed by the cooking appliance (e.g., as part of a cooking operation or meal cook cycle). Prior to inclusion with the menu set selection, the predetermined dish options may be stored at any suitable location or device that is accessible by first user device. For instance, the predetermined dish options may be stored in a database of many more predetermined dish options on the remote server, the cooking appliance, or the registered user device. Through one or more wired or wireless connections, for instance, the Appliance App on the registered device may present a user with multiple dish options that can be selected to be part of the menu set selection. In this way, a user of the registered device may compile a menu of dishes that the cooking appliance may cook.

At 520, the method 500 includes transmitting the menu set selection to one or more unregistered user devices. As noted above, an unregistered device is not generally connected to or associated with the cooking appliance. In turn, the menu set selection may be transmitted from the registered user device. For instance, the user of the registered device may select the device address (e.g., a shortcut or number for the same) corresponding to the unregistered device in order to specify that the menu set selection is to be transmitted specifically or exclusively to the unregistered device (i.e., such that the menu set selection is not publicly available to any device not specified by the registered user device). In some embodiments, the menu set selection is transmitted through a mobile messaging application, as would be understood in light of the present disclosure.

At 530, the method 500 includes transmitting the menu set selection to the cooking appliance (e.g., from the registered user device). In turn, the menu set selection may be provided to both the unregistered user device and the cooking appliance. As would be understood, the transmission at 530 may be secure, such as through a secure wireless connection, or, alternatively, unsecure, such as through a mobile messaging application. The transmission at 530 may be different from or, alternatively, similar to the transmission at 520. The transmission at 530 may occur simultaneously to or separate from 520. For instance, 530 may be initiated prior to, subsequent to, or in tandem with 520. As described above, the predetermined dish options may each include appliance instructions for a food item or meal. Thus, 530 may include transmitting appliance instructions corresponding to each predetermined dish option of the plurality of predetermined dish options.

At 540, the method 500 includes receiving a recipe selection from the unregistered user device (e.g., following 520 or 530). For instance, following 520, a user of the unregistered device may receive the menu set selection from the registered device. From the received menu set selection, the user of the unregistered device may choose one or more particular dish options (e.g., a single dish option of the plurality of predetermined dish options) as the recipe selection. The recipe selection may, in turn, represent the particular food item or meal from the menu set selection that the user of the unregistered device wants the cooking appliance to cook (i.e., the cooking operation to be performed by the cooking appliance). Optionally, the menu set selection transmitted at 520 may be formatted with or as one or more weblinks. The choice or recipe selection of the unregistered user may, in turn, be made through such weblinks or a corresponding webpage.

Once the recipe selection is made at the unregistered user device, the recipe selection may be transmitted to the cooking appliance (e.g., through an indirect connection or a direct connection). As an example, the recipe selection may be transmitted indirectly to the cooking appliance from one or more remote servers, such as a webserver hosting the webpage corresponding to the menu set selection. In some such embodiments, an input for the recipe selection is transmitted from the unregistered user device to the remote server, which may then transmit the recipe selection to the cooking appliance. As an additional or alternative example, the recipe selection may be transmitted indirectly to the cooking appliance from the registered device. In some such embodiments, an input for the recipe selection is transmitted from the unregistered user device to the registered device (e.g., via a mobile messaging service), which may then transmit the recipe selection to the cooking appliance (e.g., via the secure connection between the registered device and the cooking appliance). As another additional or alternative example, the recipe selection may be transmitted through a direct connection between the registered user device and the cooking appliance. In some such embodiments, the direct connection is a NFC connection. For instance, inputting or engaging the unregistered device to choose the recipe selection, the user of the unregistered device may be prompted to plate the unregistered device (and a NFC transmitter or network interface of the unregistered device) in suitable proximity to the cooking appliance (and a NFC receiver or network interface of the cooking appliance), such that a NFC connection may be established and the recipe selection can be transmitted to the cooking appliance.

At 550, the method 500 includes directing a cooking operation at the cooking appliance following 540. In particular, the cooking operation (and thus the actions of the cooking appliance) may be based on the received recipe selection. For instance, the received recipe selection may include (or direct the cooking appliance to perform certain actions) at one or more of the heater assemblies of the cooking appliance. Thus, 550 may include controlling a heater assembly (e.g., the microwave module, the upper heater module, the lower heater module, or the convection module) of the cooking appliance according to the received recipe selection. The control may be based on instructions corresponding to the predetermined dish option of the recipe selection and, thus, include instructions regarding, for example, duration of the cooking operation, on/off time of a heating element, intensity or power for activation of the heating element, activation pattern for the heating element, or temperature within the cooking chamber. Optionally, 550 may include controlling a fan of the cooking appliance (e.g., at convection module) according to the received recipe selection, such as on/off time of the fan, activation pattern for the heating element, or fan speed.

In certain embodiments, 550 is contingent on, not only, receiving the recipe selection at 540, but an additional user input or confirmation. For instance, following 540, 550 may be prompted in response to an input selection received at the control panel of the cooking appliance. The input selection may be as simple as engaging a single (e.g., "START") button or icon. Notably, a user of the cooking appliance may be able to ensure uncooked food items are within the cooking appliance (e.g., prior to directing or initiating the cooking operation). Additionally or alternatively, a user may be able to sufficiently cook the food items selected by the user of the unregistered device without needing to know or input the correct settings for the cooking appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooking appliance comprising:
receiving a menu set selection comprising a plurality of predetermined dish options at a registered user device apart from the cooking appliance;
commissioning, prior to receiving the menu set selection, the cooking appliance with the registered device such that the registered device and cooking appliance are associated with a common user account;
transmitting the menu set selection to an unregistered user device apart from the cooking appliance and unassociated with the common user account;
receiving a recipe selection of one or more of the plurality of predetermined dish options from the unregistered user device; and
directing a cooking operation at the cooking appliance based on the received recipe selection.

2. The method of claim 1, wherein directing the cooking operation comprises controlling a heater assembly of the cooking appliance according to the received recipe selection.

3. The method of claim 1, wherein directing the cooking operation comprises controlling a fan of the cooking appliance according to the received recipe selection.

4. The method of claim 1, wherein directing the cooking operation is in response to an input selection received at a user interface of the cooking appliance.

5. The method of claim 1, wherein the unregistered user device corresponds to a device address selected at the registered user device.

6. The method of claim 1, wherein the recipe selection is received through a direct connection between the unregistered user device and the cooking appliance.

7. The method of claim 6, wherein the direct connection is a Near-Field Communication (NFC) connection.

8. The method of claim 1, wherein the recipe selection is received through an indirect connection between the unregistered user device and the cooking appliance.

9. The method of claim 8, wherein the indirect connection is through one or more remote servers.

10. The method of claim 1, further comprising transmitting the menu set selection to the cooking appliance prior to receiving the recipe selection.

11. The method of claim 10, wherein transmitting the menu set selection to the cooking appliance further comprises transmitting appliance instructions corresponding to each predetermined dish option of the plurality of predetermined dish options.

12. A method of operating a cooking appliance comprising:
receiving a menu set selection comprising a plurality of predetermined dish options at a registered user device apart from the cooking appliance;
commissioning, prior to receiving the menu set selection, the cooking appliance with the registered device such that the registered device and the cooking appliance are associated with a common user account;
transmitting the menu set selection to an unregistered user device corresponding to a device address selected at the registered user device, the unregistered device being apart from the cooking appliance and unassociated with the common user account;
transmitting the menu set selection to the cooking appliance, wherein transmitting the menu set selection to the cooking appliance comprises transmitting appliance instructions corresponding to each predetermined dish option of the plurality of predetermined dish options;
receiving a recipe selection of one or more of the plurality of predetermined dish options from the unregistered user device; and
directing a cooking operation at the cooking appliance based on the received recipe selection.

13. The method of claim 12, wherein directing the cooking operation comprises controlling a heater assembly of the cooking appliance according to the received recipe selection.

14. The method of claim 12, wherein directing the cooking operation comprises controlling a fan of the cooking appliance according to the received recipe selection.

15. The method of claim 12, wherein directing the cooking operation is in response to an input selection received at a user interface of the cooking appliance.

16. The method of claim 12, wherein the unregistered user device corresponds to a device address selected at the registered user device.

17. The method of claim 12, wherein the recipe selection is received through a direct connection between the unregistered user device and the cooking appliance.

18. The method of claim 17, wherein the direct connection is a Near-Field Communication (NFC) connection.

19. The method of claim 12, wherein the recipe selection is received through an indirect connection between the unregistered user device and the cooking appliance.

20. The method of claim 19, wherein the indirect connection is through one or more remote servers.

* * * * *